United States Patent [19]

Zako

[11] Patent Number: 5,469,235
[45] Date of Patent: Nov. 21, 1995

[54] MATERIAL SELECTIVE DEVICE

[76] Inventor: Wayne N. Zako, 4606 S. Canyon Rd., Rapid City, S. Dak. 57702

[21] Appl. No.: 378,520

[22] Filed: Jan. 26, 1995

[51] Int. Cl.$^6$ .................................................. G03B 21/14
[52] U.S. Cl. ........................................ 353/97; 353/DIG. 5
[58] Field of Search ............................... 353/97, DIG. 5, 353/DIG. 4, 88

[56] References Cited

U.S. PATENT DOCUMENTS

| | | | |
|---|---|---|---|
| 3,269,261 | 8/1966 | Porter. | |
| 3,510,214 | 5/1970 | Crow | 353/97 |
| 3,531,193 | 9/1970 | Diehl. | |
| 3,661,449 | 5/1972 | Wright | 353/88 |
| 3,998,535 | 12/1976 | Clarke | 353/DIG. 5 |
| 4,688,910 | 8/1987 | Deary | 353/88 |
| 5,121,984 | 6/1992 | Jones et al. | 353/97 |
| 5,227,820 | 7/1993 | Miyashita et al. | 353/97 |

*Primary Examiner*—William C. Dowling
*Attorney, Agent, or Firm*—Ancel W. Lewis, Jr.

[57] ABSTRACT

A material selective device for projectors has a frame including a transparent top member and spaced opposed opaque side members that rests on the projector. A pair of opaque masking members slide in opposite sets of grooves in the inner faces of the side members to display only selected parts or all of material written on the top member or on a transparency supported by the device placed between the masking members or placed on the projector surface according to the selected positions of the masking members.

12 Claims, 2 Drawing Sheets

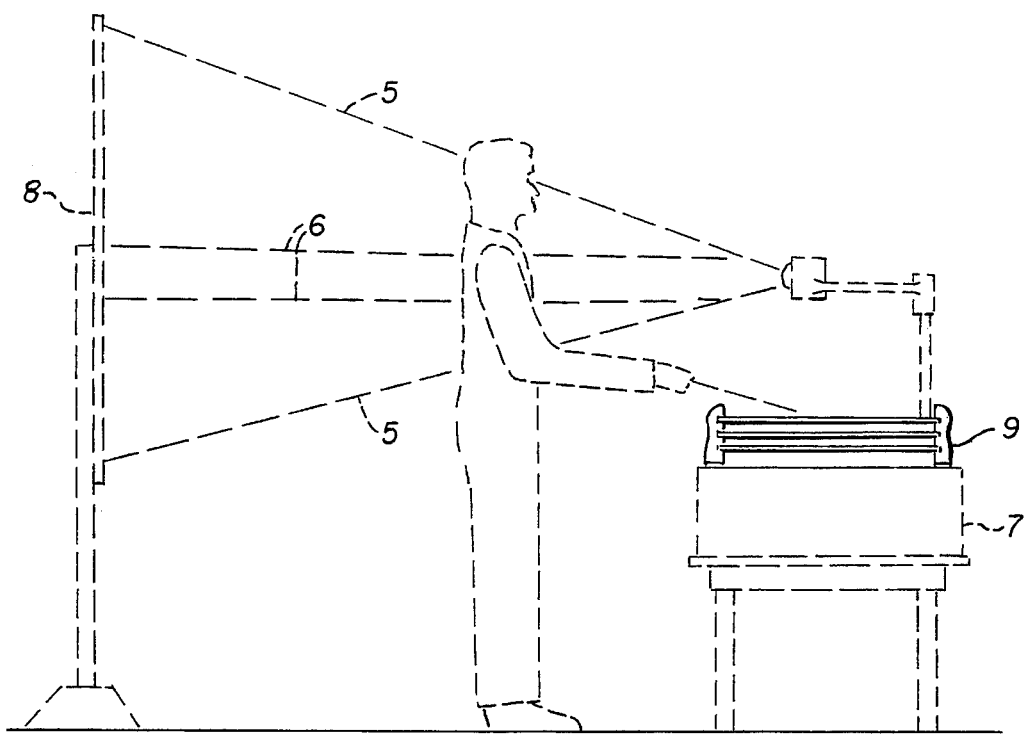
FIG.1
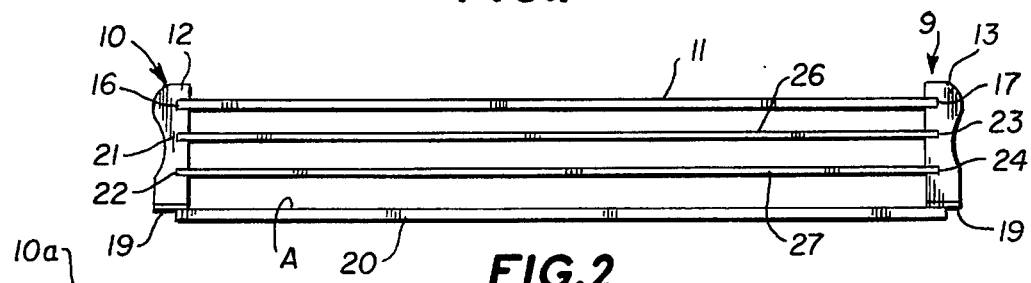
FIG.2
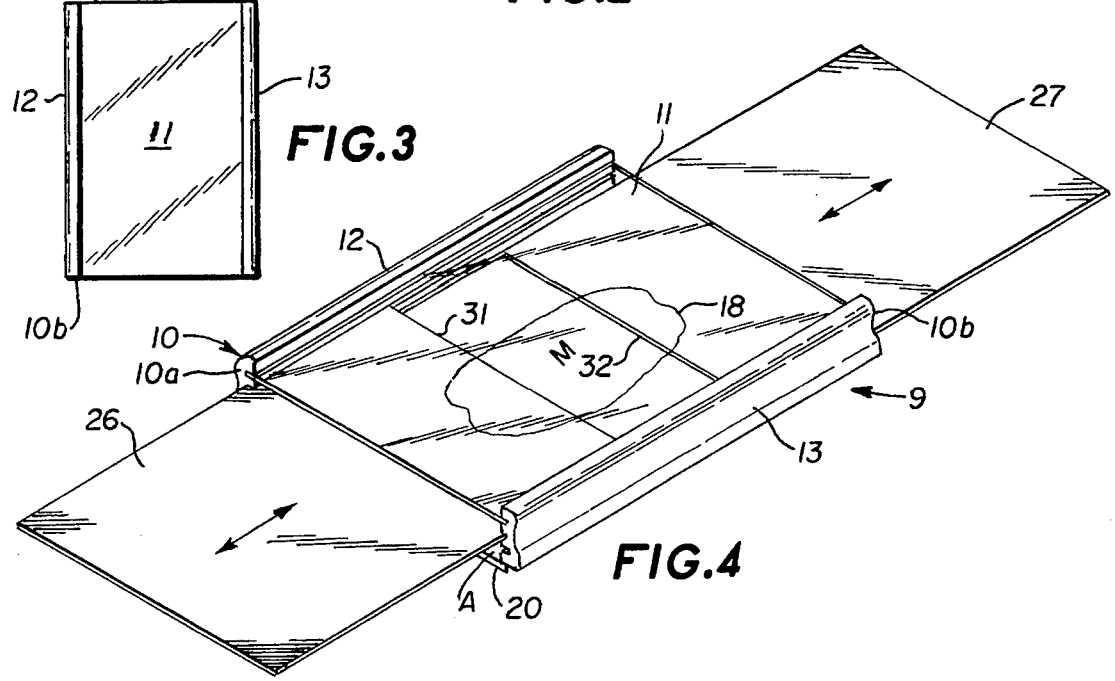
FIG.3
FIG.4

MATERIAL SELECTIVE DEVICE

TECHNICAL FIELD

This invention relates to overhead projectors and more particularly to a material selective device for an overhead projector to facilitate the selective display of only selected portions of the information or materials written thereon or on transparencies positioned thereon.

BACKGROUND ART

There are many instances where it would be advantageous to be able to display only selected portions of information or written material on an overhead projector. Typed materials displayed on transparencies are sketches, charts, printed matter and the like.

Some attempts have been made to selectively mask portions of the material on a transparency. Porter No. 3,269,261 discloses a masked sheet slidable in a frame to selectively expose material on a transparency. The information in Porter is revealed in only one way or direction. Diehl No. 3,531,193 discloses a transparency holder mounted on rollers and the use of a pair of masking plates slidable in tracks into and out of the projection area. The Diehl device is mainly a transparency holder and moving device that is not portable. Wright No. 3,661,449 discloses a frame defining a window with four slides movably mounted to selectively mask the projector window. The Wright device is in only four quadrants and is not portable. Deary No. 4,688,910 discloses a support frame for a transparency and a cover that selectively presents portions of a transparency in an overhead projector. The Deary device uses an adhesive to attach the support frame to the projector and the cover reveals the information from only one way.

DISCLOSURE OF THE INVENTION

A material selective device disclosed has a U-shaped frame that is disposed on a projector and includes a transparent top member and a pair of opposed, laterally spaced, opaque side members. First and second masking members are slidable in opposite sets of slide grooves in the side members from an overlapping retracted position to slide away from one another in opposite directions such that selectable portions of the material on a transparency between opposed end edges of the masking members are projected by the projector.

BRIEF DESCRIPTION OF THE DRAWINGS

Details of this invention are described in connection with the accompanying drawings which like parts bear similar reference numerals in which:

FIG. 1 is a schematic representation of a material selective device embodying features of the present invention mounted on an overhead projector that projects selected, materials on a screen.

FIG. 2 is an end elevation of the material selective device shown as oversize in relation to the projector and screen for clarity.

FIG. 3 is a top plan view of the material selective device with the masking members fully retracted.

FIG. 4 is a perspective view of the material selective device with the masking members in a partially extended position to project selected information.

DETAILED DESCRIPTION

Figure 5:
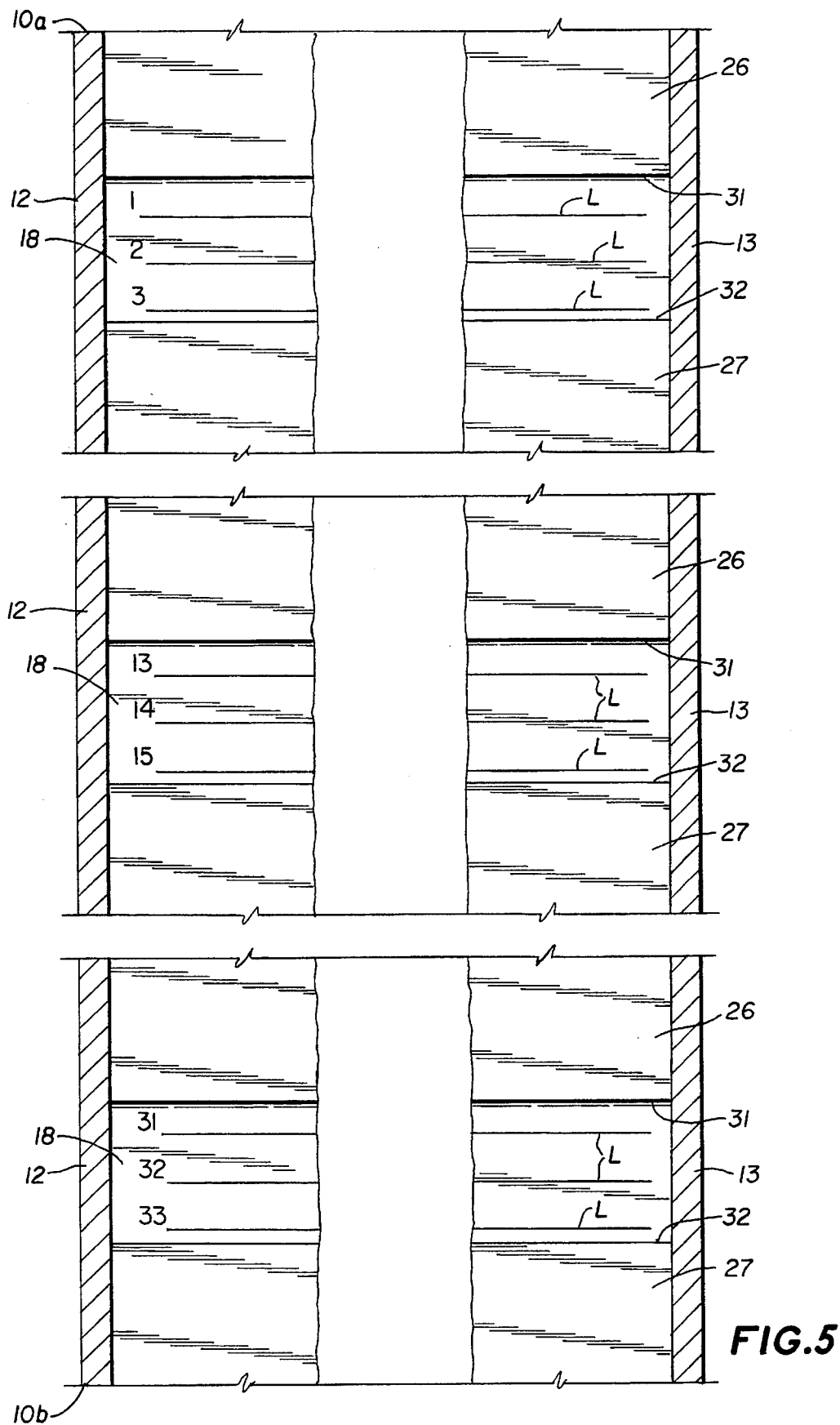
FIG. 5 is a schematic fragmentary top view of the material selective device showing a section through the top portion of the side member showing three positions for the pair of masking members to select different portions of the material on a transparency for display.

Referring now to the drawings there is shown in FIG. 1 an overhead projector 7 that displays an image on a display surface or screen 8 using a material selective device 9 embodying features of the present invention supported on the projector. In FIG. 1 the maximum available information display on the screen 8 is indicated by dashed lines 5 and a lesser selected information display on the screen 8 provided by device 9 is indicated by dashed lines 6. It is understood that any degree of material may be selected by the device from one percent (1%) or less to one hundred percent (100%). In particular, the device 9 is supported on a transparent support member 20 of the projector and the projector has a projection area A of a preselected length and width dimension through which light is projected via the support member 20.

The material selective device 9 includes an inverted U-shaped frame 10 having opposite first and second ends designated 10a and 10b. It is understood that other frame shapes may be used. The frame has a top member 11 made of a transparent material such as sheet plastic and a pair of opposed, laterally spaced side members 12 and 13 made of a solid opaque material such as wood or plastic. The top member 11 is affixed to the side members by a friction fit in inwardly facing opposed grooves 16 and 17 formed in the inside faces of side members 12 and 13, respectively, and an adhesive may be used for a secure fastening. The side members 12 and 13 are spaced in relation to the projection area A to prevent light from being projected along both sides of the device out the display surface 8. A friction foot 19 is shown provided on the underside of each bottom face of the side members that is made of rubber or an elastomer to prevent the frame from sliding or slipping during usage. Side member 12 has two vertically spaced slide grooves 21 and 22 along an inside face vertically spaced below groove 16 and side member 13 has two vertically spaced slide grooves 23 and 24 vertically spaced below groove 17.

A first masking member 26 is slidable in a first set of the opposed grooves 21 and 23 and a second masking member 27 is slidable in a second set of the opposed grooves 22 and 24. The masking members are coextensive in length with the frame 10 and specifically both the top member and side members as shown in FIG. 3. The first masking member 26 has an end edge 31 and the second slide member has an end edge 32. In use the two masking members are moved away or slid in the slots from a retracted position in which they are fully in the frame in opposite directions to form the gap between the end edges. The masking members move to form a space or gap of a selected distance at any point along the side members. This facilitates selective displaying of the material on the transparency according to the selective positioning of the members 26 and 27 and specifically end edges 31 and 32.

Referring now to FIG. 5 there is illustrated a transparency 18 having written material including spaced lines L from top to bottom with the lines L numbered by numbers 1–35 with only numbers 1, 13, 14, 15, 23, 31, 32 and 33 shown. The transparency 18 may rest face up on top of member 11 as shown in FIG. 4 or directly on the projector below masking member 27 or between members 11 and 26. In a first position for the masking members, masking member 26 has been withdrawn from the frame so that its end edge 31 is close to frame end edge 10a. Masking member 27 has been withdrawn only short distance from end 10a so that its end edge 32 is spaced from end 31 a distance to unmask or expose the first three lines 1, 2 and 3 for projection onto the display surface. In a second position both masking members are withdrawn almost halfway out unmasking exposing intermediate lines 13, 14 and 15 for display onto the display surface.

In a third position that is a reverse of position 1, the first masking member 26 is extended so as to be almost all the way into the frame with end edge 31 a selected distance in from frame end 10b and second masking member 27 is almost entirely withdrawn with end edge closer to frame end 10b to unmask or expose lines 31, 32 and 33 on the transparency 18.

In a like manner any materials written on top member 11 as with a marker such the letter M shown in FIG. 4 would be displayed via the device of the present invention when the masking members are retracted to allow the letter M to be displayed.

A device constructed in accordance with the present invention has a length of about 12 inches, a width of about 8.5 inches between the inside surfaces of side members 12 and 13 and a width of 9.75 inches. This device accommodates the projection area of most commercially available projectors.

This device has in essence an almost infinitely variable degree of selectivity of the material displayed. This may be expressed as selectivity from 0.001% to 100%. The prior art allows the display of only certain predetermined positions at a time. The device according to the present invention is extremely portable, lightweight, and is usable on all known projectors.

Although the present invention has been described with a certain degree of particularity, it is understood that the present disclosure has been made by way of example and that changes in details of structure may be made without departing from the spirit thereof.

What is claimed is:

1. A material selective device for an overhead projector having a transparent support member and a projection area through which light is projected via said support member to project light on a display surface comprising:

a frame having opposite first and second ends and adapted to be placed on said support member, said frame including a transparent top member made of a rigid sheet of plastic material and a pair of opposed side members, each said side member having a first slide groove opening along an inside face, each said side member having a second slide groove below and spaced from said first slide groove, a first movable masking member slidable in an opposite set of said first slide grooves below said top member, said first masking member having a first inner end edge and being incrementally movable between said first and second ends, a second movable masking member slidable in a second set of opposite of said slide grooves below said first masking member, said second masking member having a second inner end edge and being incrementally movable between said first and second ends, whereby the material on said top member and material on a transparency between said side members and material on the projector support member is selectively projected and displayed according to selected positions of said masking members relative to said first and second ends.

2. A device as set forth in claim 1 wherein each said side member has a fastening groove opening along an inside face with said top member having side edge portions in opposite of said fastening grooves and firmly secured therein to rigidly connect said top member to said side members.

3. A device as set forth in claim 1 wherein each of said top member and slide members are a rigid sheet of substantially uniform thickness of a plastic material.

4. A device as set forth in claim 1 including a pad of friction material mounted on the bottom face of each of said side members to prevent said side members from sliding relative to said support member.

5. A device as set forth in claim 1 wherein said side members are made of an opaque material.

6. A device as set forth in claim 1 wherein said side members are made of wood.

7. A device as set forth in claim 1 including a friction pad mounted on a bottom face of each of said side members to hold said from sliding relative to said support member.

8. A device as set forth in claim 1 wherein said masking members have the same length as said frame.

9. A device as set forth in claim 1 wherein said masking members are readily slid out of and removable from said frame.

10. A device as set forth in claim 1 wherein said side members are spaced in relation to the width of said projection area to prevent light from being projected along the sides of said side members to a display surface.

11. A device as set forth in claim 1 wherein said device has a length of about twelve inches, an outside width of about 9.75 inches and an inside width between the inside surfaces of said side members of about 8.5 inches.

12. A material selective device for an overhead projector having a transparent support member and a projection area through which light is projected via said support member to project light on a display surface comprising:

a frame having opposite first and second ends and adapted to be placed on said support member, said frame including a transparent top member and a pair of opposed opaque side members, said side members being spaced in relation to the width of said projection area to prevent light from being projected along both sides of said side members to a display surface, each said side member having a first slide groove opening along an inside face, each said side member having a second slide groove below and spaced from said first slide groove, a first movable masking member slidable in an opposite set of said first slide grooves below said top member, said first masking member having a first inner end edge and being incrementally movable between said first and second ends, a second movable masking member slidable in a second set of opposite of said slide grooves below said first masking member, said second masking member having a second inner end edge and being incrementally movable between said first and second ends, said masking members being the same length as said frame, overlapping one another and coextensive in a retracted position, whereby the material on said top member and material on a transparency between said side members and material on the projector support member is selectively projected and displayed according to selected positions of said masking members relative to said first and second ends.

* * * * *